(12) United States Patent
De Sousa Bispo et al.

(10) Patent No.: US 10,963,371 B1
(45) Date of Patent: Mar. 30, 2021

(54) TESTING INTEGRATION AND AUTOMATION SYSTEM

(71) Applicant: salesforce.com, inc., San Francisco, CA (US)

(72) Inventors: Mariano Edgardo De Sousa Bispo, Buenos Aires (AR); Evangelina Martinez Ruiz Moreno, Buenos Aires (AR); Federico Balbi, Buenos Aires (AR); Santiago Vacas, Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 19 days.

(21) Appl. No.: 16/590,414

(22) Filed: Oct. 2, 2019

(51) Int. Cl.
*G06F 9/44* (2018.01)
*G06F 11/36* (2006.01)

(52) U.S. Cl.
CPC ...... *G06F 11/3688* (2013.01); *G06F 11/3664* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 6,745,160 B1* | 6/2004 | Ashar | G06F 30/3323 703/14 |
| 2004/0049609 A1* | 3/2004 | Simonson | G06F 9/541 710/8 |
| 2007/0261124 A1* | 11/2007 | Centonze | G06F 21/6227 726/27 |
| 2012/0102364 A1* | 4/2012 | Kemmler | G06F 8/65 714/38.1 |
| 2013/0041613 A1* | 2/2013 | Bhide | G06F 11/3688 702/123 |
| 2018/0341755 A1* | 11/2018 | Aschauer | G06F 21/51 |
| 2020/0159650 A1* | 5/2020 | Deshpande | G06F 8/433 |

* cited by examiner

*Primary Examiner* — Anna C Deng
(74) *Attorney, Agent, or Firm* — Sterne, Kessler, Goldstein & Fox P.L.L.C.

(57) ABSTRACT

Disclosed herein are system, method, and computer program product embodiments providing a testing integration and automation system. An embodiment operates by receiving a component selection of a set of one or more components of the computing program for testing from a testing interface. A test procedure for testing a new component for the computing program with the selected one or more components of the set is identified. A selection of a runtime environment in which to test the new component and the computing program is received from the testing interface. The test procedure is executed in the selected runtime environment to generate testing results. The testing results of the executing the test procedure in the selected runtime environment are provided via the testing interface.

14 Claims, 3 Drawing Sheets

TESTING INTEGRATION AND AUTOMATION SYSTEM

BACKGROUND

Testing improvements to software applications is an important part of the software development cycle. However, testing new versions of components of existing software applications can become increasingly cumbersome as the number of updates increase and/or those updates are released into different runtime environments or operating systems. Manually testing the numerous and varied combinations of versions and runtimes with the new components may quickly become costly, cumbersome, and slow down software development.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a testing integration and automation system.

Figure 1:
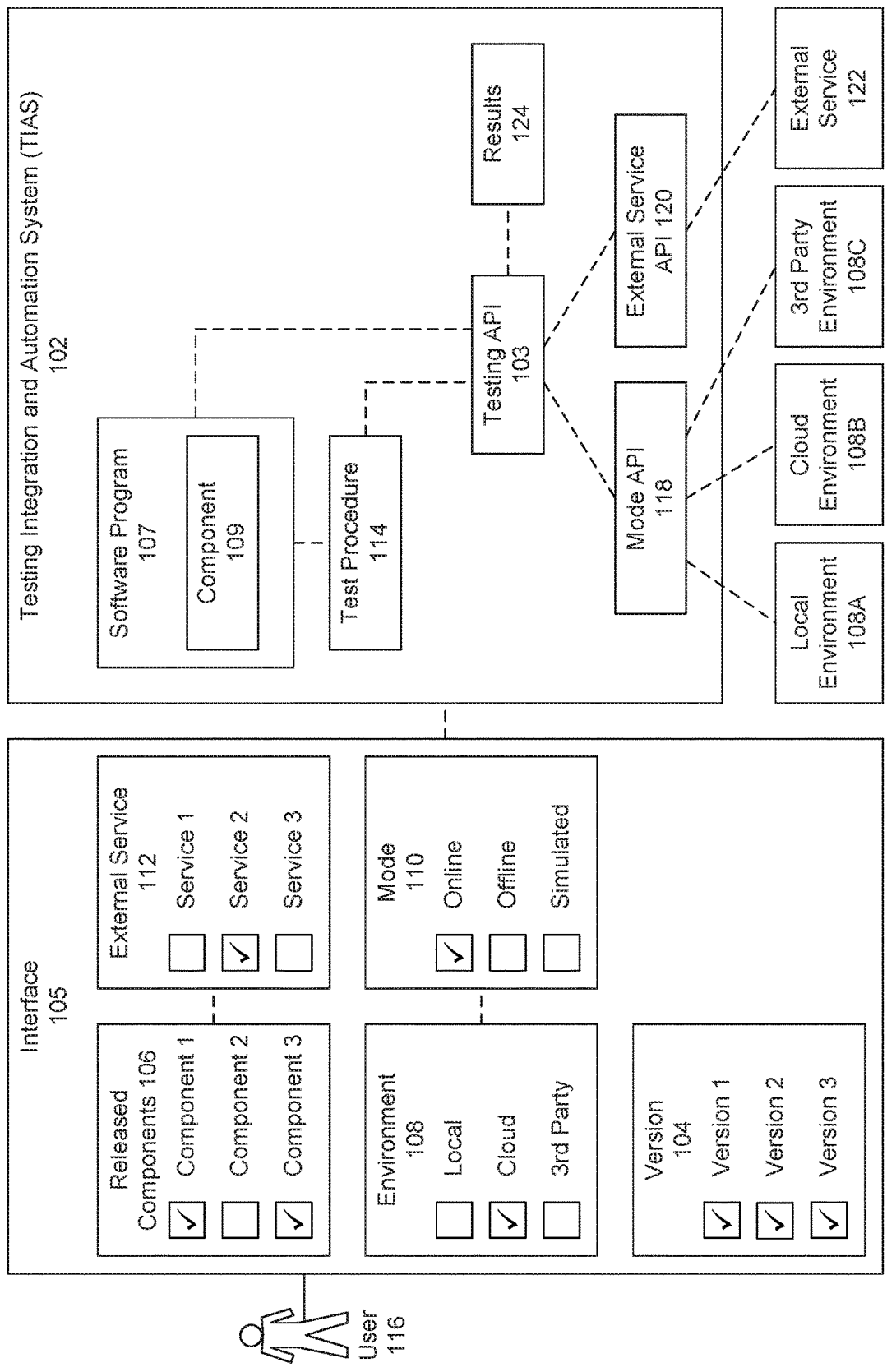
FIG. 1 is a block diagram showing example operations and functionality related to providing a testing integration and automation system, according to some embodiments.

FIG. 1 is a block diagram 100 showing example operations and functionality related to providing a testing integration and automation system, according to some embodiments.

The testing of improvements to software applications is an important part of the software development process. However, testing newly developed or modified components of a software application can become increasingly cumbersome as the number of components, versions, and/or runtime environments into which those versions are released increase, especially if both forwards and backwards compatibility wants to be maintained. Manually testing the numerous and varied combinations of versions and runtimes with the new components may not be practical for a software development team due to time and/or resource constraints.

For example, each time a new component is added to a software program, the component may need to be tested against any different number of released versions of the software program. Each version may then be compatible with any combination of installed or previously developed and released components. And then those versions with varying component combinations may be executing or executable across a different number of operating or runtime environments.

TABLE 1

Software Variations for Testing New or Modified Components

| Release Version | Components | Environments |
| --- | --- | --- |
| 1.0 | Print | Web services |
| 1.1 | User ID check | Cloud 1 |
| 1.1.2 | Security Validator | Cloud 2 |
| 1.2 | Scanning | Local |
| 2 | | Client ABC |
| 2.01 | | |
| 3 | | |

As illustrated in the example of Table 1, a particular software program may have seven released versions of the software which may be in use by any different numbers of clients. Each version may be released with or configurable to include any of the four different components or functionality illustrated in the table. Further, the various combinations or versions and components may be executing or executable across a varying set of runtime or computing environments, five of which are illustrated in the table.

As such, with the development and release of even a single new component for the software, complete testing may include testing across at least 140 different testing scenarios (7×4×5=140) to ensure forwards and backwards compatibility across all the released versions, component combinations, and executable environments. In another embodiment, the program may also connect to third party or external services, which may further increase the number of testable scenarios.

A developer or quality assurance engineer may design a number of functional tests that test the newly developed or modified functionality of the new component to ensure the component operates properly in various usage scenarios. For example, a developer may design 100 different tests for the new component. As such, manually designing and testing 140,000 different scenarios prior to releasing a single new component may stall development, or derail it completely. This may also produce dissatisfied customers who are not receiving timely component or software updates. This testing may require more computing power and personnel hours than may be available in order to ensure full functionality testing.

The testing integration and automation system (TIAS) 102 addresses these and other challenges in testing software updates, while ensuring both forwards and backwards compatibility of new or modified components 109 for a software application or program 107. In an embodiment, TIAS 102 provides a testing framework or interface enabling forwards and backwards compatibility testing of various versions, component combinations of a software program 107 across various runtime or operating system environments. TIAS 102 further enables a user 116, such as a developer or quality assurance engineer, to develop a single functional test procedure 114 which TIAS 102 may then execute against the various testing scenarios.

In an embodiment, TIAS 102 may include a testing application programming interface (testing API) 103 that enables various testable elements to be integrated independently of one another through testing API 103. Testing API 103 may function as a proxy or intermediary for requests and responses to and from the newly updated component 109 and other systems or components. For example, testing API 103 may be configured or configurable to communicate with and access various software versions 104, previously released components 106, environments 108, modes 110, and external services 112.

TIAS 102 may enable software developers or other users 116 to develop and submit a test procedure 114 for execution. Test procedure 114 may include any number of functional tests for a new component 109 to be integrated into or that is compatible with software program 107. The tests of test procedure 114 may include global tests that agnostic relative to the various combinations of environmental features with which the software program may be integrated, which TIAS 102 may execute across all the selected environments 108. In an embodiment, test procedure 114 may also include environment, runtime, or operation system specific tests as well, which TIAS 102 only executes against the relevant environments 108. TIAS 102 may configure the testing environments to execute the tests of test procedure 114.

For example, rather than requiring user 116 to write the 100 tests for each of the 140 different testing scenarios (as described above), user 116 may simply write or develop the 100 tests once as test procedure 114. TIAS 102 may then execute the tests of test procedure 114 against the 140 different scenarios, or fewer depending on user testing preferences or selections, including both global and localized tests.

In an embodiment, TIAS 102 may enable a user 116 to configure a testing environment or select test parameters or elements using a testing interface 105. User 116 may be a software developer, administrator, quality assurance engineer or other individual or group of individuals who is responsible for testing software program 107 (also referred to herein as software 107).

In an embodiment, a new module or component 109 of software 107 may have been developed. Component 109 may include an executable component or code that may be integrated into or be compatible with software program 107. Component 109 may be a new module that includes any new functionality of software 107.

In another embodiment, component 109 may include an existing component or module that has been modified through adding, editing, or removing existing code, and may be designed to replace a previously replaced component 106. Some examples of components that may be added to a software program 107 are illustrated in Table 1 (above).

Interface 105 may provide user 116 with the ability to select, via interface 105, the testing elements of test procedure 114 to be activated in executing test procedure 114. Software program 107 may include a base application or program that has one more versions 104 that have been released and/or are active across one or more client computing environments. The client computing environments may be any runtime, operating system, or other computing environments, each with its own set of technical capabilities, computing resources, and software applications that are configured across one or more devices.

Environments 108 may include any technical configurations used to execute or access one of the released versions 104 of software 107, which may include various combinations of released components 106 having been activated. In different embodiments, environments 108 may include a local computing environment, cloud computing or other network based computing environments, network or Internet servers operating different server platforms, different mobile devices with differing technical capabilities and/or mobile device platforms, devices with different versions of different operating systems, etc.

The selectable environments 108 from interface 105 may each be configured to address a number of issues or variations including the layout of application memory, how the program accesses variables, mechanisms for passing parameters between procedures, interfacing with the operating system, and otherwise. In an embodiment, a compiler may make assumptions depending on the specific runtime system to generate correct code, and thus executions and test results may vary in different environments 108. Typically the runtime system will have some responsibility for setting up and managing the stack and heap, and may include features such as garbage collection, threads or other dynamic features built into the language. As such, testing across different environments 108 may be beneficial.

In an embodiment, TIAS 102 may enable user 116 to select which versions 104 of software 107 with which to test the compatibility of the newly developed component 109. In the example of FIG. 1, there may be three selectable or previously released versions 104 of software 107. And as illustrated, user 116 may have selected all three available versions for testing. Testing API 103 may then activate connections or otherwise already be provided access to the code or executable files of all three different versions of software 107 individually. In an embodiment, component 109 may be designed or specify an earliest version 104 of the software with which the component 109 was designed to be operable.

User 116 may also select which released components 106 to test with each of the selected versions 104 of software 107. The released components 106 may include optional or required modules or functionality that may be compatible across one or more released versions 104 of software 107. In the example illustrated, user 116 may have selected components 1 and 3. In an embodiment, test procedure 114 may include the testing of one or more of the selected released components 106 to ensure the addition of component 109 does not affect their operations, or that their operations are affects appropriately.

In an embodiment, testing API 103 may have preconfigured access to the code of or executable files for the various components 106, available for testing. In an embodiment, if component 3 is not compatible with version 2, then TIAS 102 may not test this combination despite a user 116 selecting both component 3 and version 2. In an embodiment, TIAS 102 may issue a warning via interface 105 or in results 124 indicating which selected combinations were not tested.

User 116 may also select in which environments or against which technical configurations or computing systems to test the selected version 104 and released component 106 combinations. As referenced above, the selectable environments 108 may include any different number of technical device and/or software or operating system based variations.

The example illustrated may include three selectable environments corresponding to local environment 108A, cloud environment 108B, and $3^{rd}$ party environment 108C. Local environment 108A may be or include a local device or local network associated with the user 116 executing the test or a user to client account that is selected. Cloud environment 108B may include any set of network devices that are configured to communicate or operating based on cloud computing technology. $3^{rd}$ party environment 108C may be any other specialized computing system configuration, such as the configuration of a particular client that may be operating one or more versions 104 of software 107.

In an embodiment, testing API 103 may communicate directly with devices of the environments 108A, 108B, 108C, or may have indirect access through a mode API 118. TIAS 102, through testing API 103, may allow new runtime or selectable environments 108 to be added, or existing environments to be removed or modified with affecting the operations of other environments.

In an embodiment, mode API 118 may enable user 116 to select a runtime or operational mode 110 of the selected environment(s) 108 in which to execute the testing of component 108. Mode API 118 may enable a test to be executed in an offline mode, online mode, or a mocked or simulated mode. Online mode may enable TIAS 102 to have live access to a system in which software 107 is already executing. Offline mode may enable or cause TIAS 102 to execute testing when one or more devices of a selected environment 108 have been disabled or are offline. A simulated environment may enable a copy or replica of the environment 108 against which to test the component 109.

User 116 may also select one or more external services 112 with which to test component 109. External services 112 may include any third party components to which user 116 or other software developers do not have direct access to the code. External services 112 may be accessible through a third party or external service API 120. Testing API 103 may be configured to interact or communicate with external service APIs 120 for any selectable external services 122.

In an embodiment, component 109 may be a printing component that enables a client to print to a number of printers from software program 107. Component 109 may interact with or have the option for a client to send the print job to a print shop for professional printing instead (e.g., external service 120). As such, component 109 may be configured to communicate with external service 122 through external service API 120. TIAS 102 thus enables the selection of any external service APIs with which a new component 109 or previously released components 106 may be configured to interact.

Once user 116 has selected the elements or parameters under which to execute test procedure 114, TIAS 102 may configure the software 107, components 106, environments 108, modes 110, and external services 112 accordingly. For example, TIAS 102 may activate the components configured to communicate with test API 103, and execute the relevant tests of test procedure 114 against the various environments 108A, 108B, 108C and generate testing results 124.

In an embodiment, results 124 may include the results of test procedure 114 broken down by the various combinations and configurations selected by user 116. In an embodiment, results 124 may indicate whether the test was passed, failed (and any indication as to a cause of failure) or could not be executed (and any indication as to why the test could be executed) for each combination of selections from interface 105.

User 116 may then review results 116 and determine whether to modify component 109 or software 107, authorize the component for release to clients across one or more of the selected versions 104 and/or environments 108, or test the component 109 again at a later time because a an inactive or failed connection during an online mode 110 may have resulted in one or more of the tests not being executed.

Figure 2:
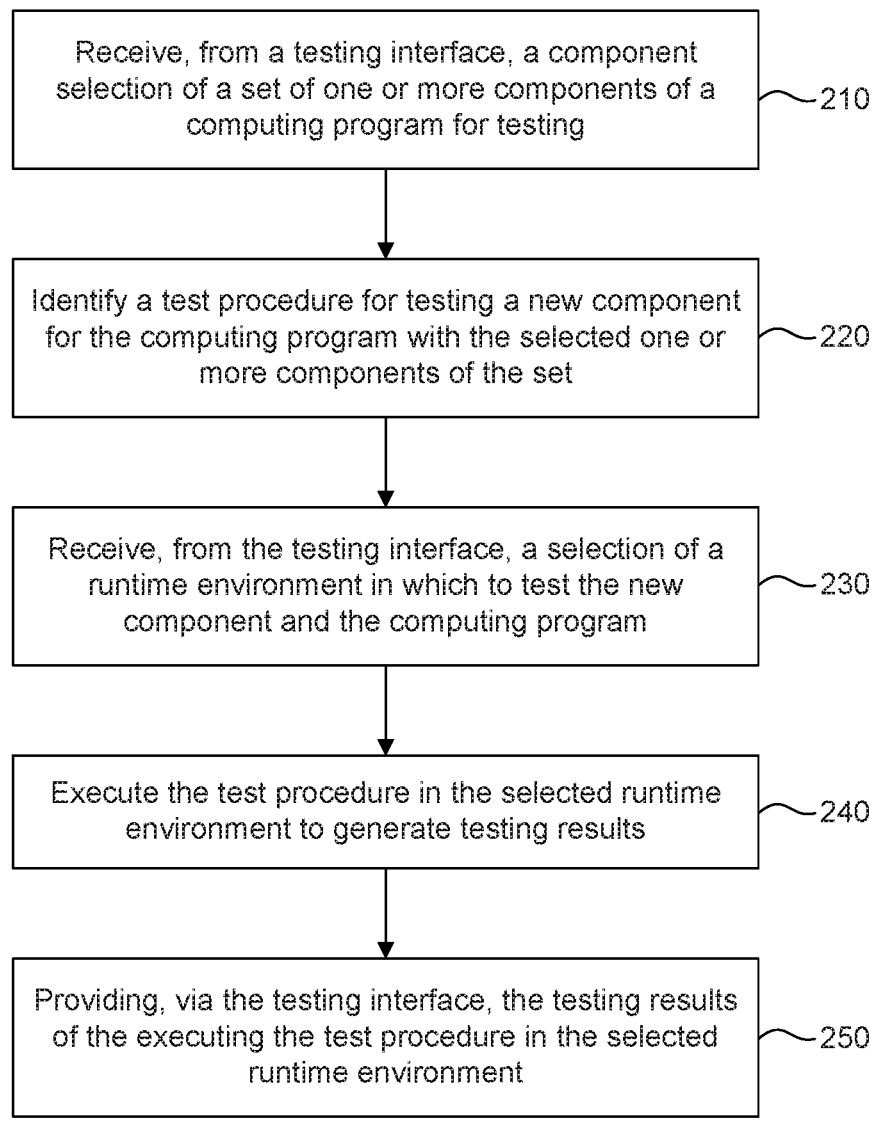
FIG. 2 is a flowchart illustrating a process for providing a testing integration and automation system, according to some embodiments.

FIG. 2 is a flowchart illustrating a process 200 for providing a testing integration and automation system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 210, a component selection of a set of one or more components of a computing program for testing is received from a testing interface. For example, user 116 may select which released components 106 to test with component 109 of software program 107. In an embodiment, TIAS 102 may have access to at least a portion of the executable code of the component 109 or software 107 to perform the testing.

At 220, a test procedure for testing a new component for the computing program with the selected one or more components of the set are identified. For example, TIAS 102 may receive a test procedure 114 including one or more functional tests for testing component 109, and one or more selected components 106 or other features of software 107.

At 230, a selection of a runtime environment in which to test the new component and the computing program is received from the testing interface. For example, TIAS 102 may receive the selections of one more environments 108 from user interface 105. As illustrated, interface 105 may provide for the selection of any different number of available runtime environments in which software 107 has been released or is executable.

At 240, the test procedure is executed in the selected runtime environment to generate testing results. For example, TIAS 102 may execute testing API 103 as a proxy for testing the selected versions 104 of software 107, including the newly developed component 109, against each selected environment 108, using the tests of test procedure 114.

At 250, the testing results of the executing the test procedure in the selected runtime environment are provided via the testing interface. For example, TIAS 102 may generate results 124 and display at least a portion of results 124 on testing interface 105 during testing and/or after testing has completed.

Figure 3:
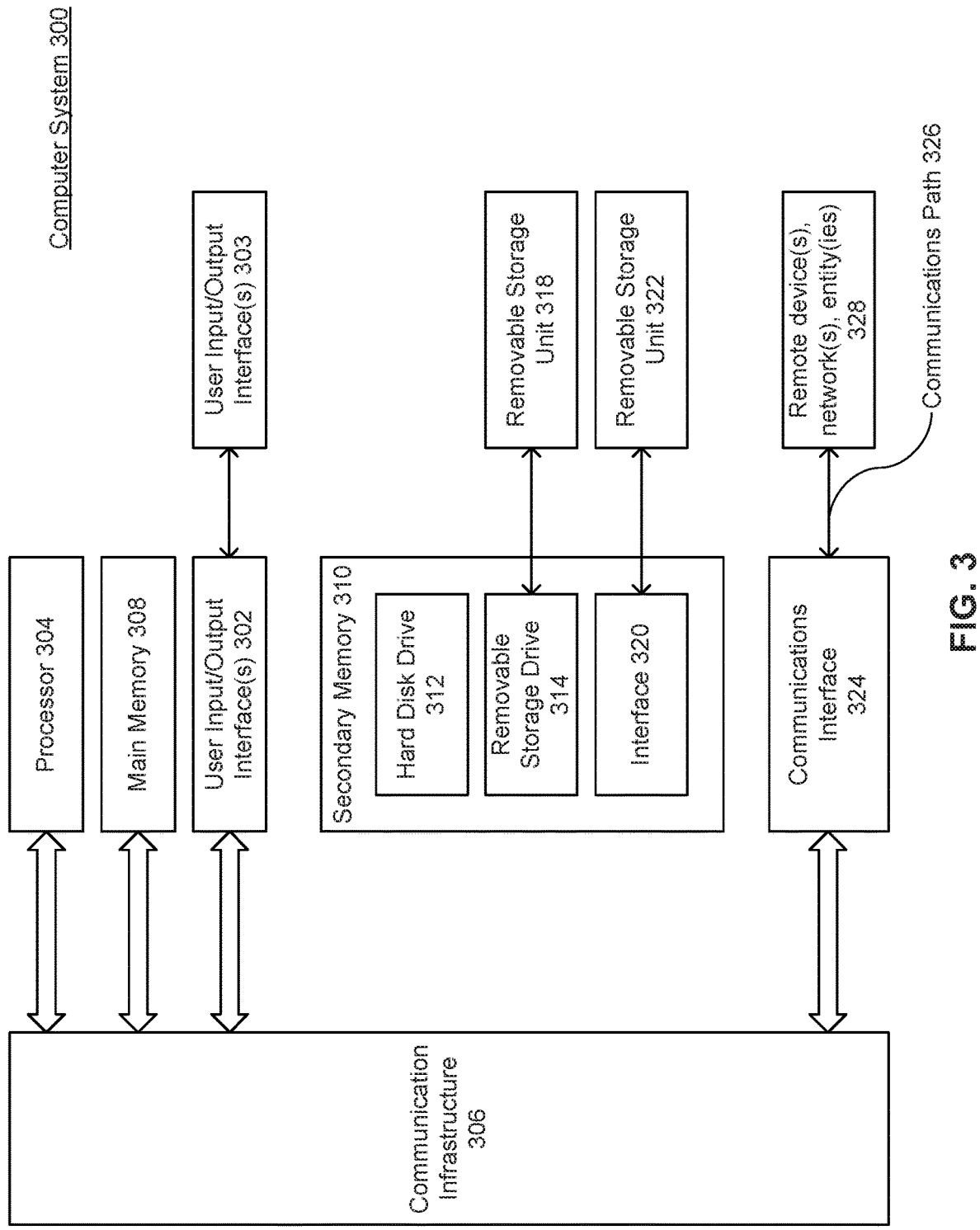
FIG. 3 is an example computer system useful for implementing various embodiments.

Various embodiments can be implemented, for example, using one or more computer systems, such as computer system 300 shown in FIG. 3. Computer system 300 can be used, for example, to implement the systems described above with respect to the figures, and/or the method of FIG. 3. Computer system 300 can be any computer capable of performing the functions described herein.

Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for testing a computing program, comprising:
receiving, from a testing interface, a component selection of a set of one or more components of the computing program for testing, wherein the set of the one or more components comprise at least a portion of executable code of the computing program;
identifying a test procedure for testing a new component for the computing program with the selected set of the one or more components;
receiving, from the testing interface, a selection of a runtime environment in which to test the new component and the computing program, wherein the testing interface provides for the selection of the runtime environment from a plurality of runtime environments in which the computing program is executable;
receiving, from the testing interface, a mode selection indicating whether to execute the test procedure in an online mode, an offline mode, or a simulated runtime environment mode in the selected runtime environment, receiving, from the testing interface, an external services selection indicating an external service with which to test the set of the one or more components;

executing the test procedure in the indicated mode in the selected runtime environment to generate testing results of executing the test procedure, wherein executing the test procedure comprises communicating with the indicated external service during execution of the test procedure; and providing, via the testing interface, the testing results of the executing the test procedure in the selected runtime environment.

2. The method of claim 1, wherein the executing comprises:

communicating with the external service during the executing using an application programming interface (API) corresponding to the external service.

3. The method of claim 1, wherein a testing application programming interface (API) is configured to communicate with each of the plurality of runtime environments to perform the executing.

4. The method of claim 1, wherein receiving the runtime environment selection comprises:

receiving the selection of the runtime environment comprising two or more of the plurality of runtime environments.

5. The method of claim 4, wherein generating the test results comprises generating independent results for each of the selected two or more of the plurality of runtime environments.

6. The method of claim 1, wherein the computer program was launched in the online mode in the selected runtime environment.

7. A system, comprising:

a memory; and at least one processor coupled to the memory and configured to perform operations comprising:

identifying a test procedure for testing a new component for a computing program with a selected set of one or more components;

receiving, from a testing interface, a selection of a runtime environment in which to test the new component and the computing program, wherein the testing interface provides for the selection of the runtime environment from a plurality of runtime environments in which the computing program is executable;

receiving, from the testing interface, a mode selection indicating whether to execute the test procedure in an online mode, an offline mode, or a simulated runtime environment mode in the selected runtime environment, receiving, from the testing interface, an external services selection indicating an external service with which to test the selected set of the one or more components;

executing the test procedure in the indicated mode in the selected runtime environment to generate testing results of executing the test procedure, wherein executing the test procedure comprises communicating with the indicated external service during execution of the test procedure; and providing, via the testing interface, the testing results of the executing the test procedure in the selected runtime environment.

8. The system of claim 7, wherein the executing comprises:

communicating with the external service during executing the test procedure using an application programming interface (API) corresponding to the external service.

9. The system of claim 7, wherein a testing application programming interface (API) is configured to communicate with each of the plurality of runtime environments to perform the executing.

10. The system of claim 7, wherein the receiving the selection of the runtime environment comprises:

receiving the selection of the runtime environment comprising two or more of the plurality of runtime environments.

11. The system of claim 10, wherein generating the test results comprises generating independent results for each of the selected two or more of the plurality of runtime environments.

12. The method of claim 1, wherein the computer program was launched in the online mode in the selected runtime environment.

13. A non-transitory computer-readable device having instructions stored on a memory thereon that when executed by at least one processor, causes the at least one processor to perform operations comprising:

receiving, from a testing interface, a component selection of a set of one or more components of the computing program for testing, wherein the set of the one or more components comprise at least a portion of executable code of the computing program;

identifying a test procedure for testing a new component for the computing program with the selected set of one or more components;

receiving, from the testing interface, a selection of a runtime environment in which to test the new component and the computing program, wherein the testing interface provides for the selection of the runtime environment from a plurality of runtime environments in which the computing program is executable;

receiving, from the testing interface, a mode selection indicating whether to execute the test procedure in an online mode, an offline mode, or a simulated runtime environment mode in the selected runtime environment, receiving, from the testing interface, an external services selection indicating an external service with which to test the set of the one or more components;

executing the test procedure in the indicated mode in the selected runtime environment to generate testing results of executing the test procedure, wherein executing the test procedure comprises communicating with the indicated external service during executing the test procedure; and providing, via the testing interface, the testing results of the execution of the test procedure in the selected runtime environment.

14. The non-transitory computer-readable device of claim 13, wherein the executing comprises:

communicating with the external service during executing the test procedure using an application programming interface (API) corresponding to the external service.

* * * * *